US011086400B2

(12) United States Patent
Jonasson et al.

(10) Patent No.: US 11,086,400 B2
(45) Date of Patent: Aug. 10, 2021

(54) GRAPHICAL USER INTERFACE FOR CONTROLLING HAPTIC VIBRATIONS

(71) Applicant: SonicSensory, Inc., Los Angeles, CA (US)

(72) Inventors: Jens Jonasson, Los Angeles, CA (US); Tyson Hubley, Los Angeles, CA (US)

(73) Assignee: SONICSENSORY, INC, Los Angeles, CA (US)

( * ) Notice: Subject to any disclaimer, the term of this patent is extended or adjusted under 35 U.S.C. 154(b) by 0 days.

(21) Appl. No.: 16/673,529

(22) Filed: Nov. 4, 2019

(65) Prior Publication Data
US 2020/0379564 A1    Dec. 3, 2020

Related U.S. Application Data

(60) Provisional application No. 62/855,860, filed on May 31, 2019.

(51) Int. Cl.
*G06F 3/0481*    (2013.01)
*G06F 3/0346*    (2013.01)
(Continued)

(52) U.S. Cl.
CPC ............ *G06F 3/016* (2013.01); *G06F 3/0412* (2013.01); *G06F 3/0488* (2013.01);
(Continued)

(58) Field of Classification Search
CPC .... G06F 3/016; G06F 3/04146; G06F 3/0412; G06F 3/04817; G06F 3/04842; G06F 3/04845; G06F 3/0488; G06F 2203/04105
See application file for complete search history.

(56) References Cited

U.S. PATENT DOCUMENTS

| 9,609,230 B1* | 3/2017 | Bakshi | ................. H04N 5/2256 |
| 2009/0295739 A1* | 12/2009 | Nagara | ................... G06F 3/016 345/173 |

(Continued)

FOREIGN PATENT DOCUMENTS

WO    WO 2014/027095 A1    2/2014

OTHER PUBLICATIONS

Fu et al., "Haptic Shoes: Representing Information by Vibration," *Australian Computer Society, Inc.* (2005) [Retrieved on Jul. 8, 2020 from URL: https://crpit.scem.westernsydney.edu.au/confpapers/CRPITV45Fu.pdf].

(Continued)

*Primary Examiner* — Jennifer N To
*Assistant Examiner* — Kc Chen
(74) *Attorney, Agent, or Firm* — Neal, Gerber & Eisenberg LLP

(57) ABSTRACT

Embodiments include a method for controlling an output generated by a haptic device, using an electronic device communicatively coupled to the haptic device and having a touch-sensitive surface and a display. The method comprises displaying a first graphical object comprising a plurality of intensity level markers representing different vibrational intensity levels; displaying a second graphical object on top of at least a portion of the first graphical object; detecting a contact at a first location of the touch-sensitive surface; detecting a movement of the contact across the touch-sensitive surface to a second location of the touch-sensitive surface; and in response to the detected movement: adjusting a size of the second graphical object from a first size to a second size corresponding to a second intensity level marker, and causing the haptic device to change the selected vibrational intensity level to a second vibrational intensity level represented by the second marker.

15 Claims, 11 Drawing Sheets

(51) Int. Cl.
    *G06F 3/0338* (2013.01)
    *G06F 3/01* (2006.01)
    *G06T 7/50* (2017.01)
    *G06F 3/041* (2006.01)
    *G06F 3/0484* (2013.01)
    *G06F 3/0488* (2013.01)

(52) U.S. Cl.
    CPC ...... *G06F 3/04146* (2019.05); *G06F 3/04817* (2013.01); *G06F 3/04842* (2013.01); *G06F 3/04845* (2013.01); *G06F 2203/04105* (2013.01)

(56) References Cited

U.S. PATENT DOCUMENTS

| | | | |
|---|---|---|---|
| 2010/0083116 A1* | 4/2010 | Akifusa | G06F 3/0488 715/727 |
| 2012/0186101 A1 | 7/2012 | Sanchez | |
| 2013/0055758 A1 | 3/2013 | Carter et al. | |
| 2013/0246955 A1* | 9/2013 | Schwesig | G06F 3/0304 715/767 |
| 2013/0346921 A1* | 12/2013 | Shiplacoff | H04M 1/67 715/835 |
| 2015/0022328 A1 | 1/2015 | Choudhury | |
| 2015/0193196 A1* | 7/2015 | Lin | H04R 3/04 715/716 |
| 2017/0270848 A1* | 9/2017 | Liu | G06F 3/04842 |
| 2018/0000190 A1 | 1/2018 | Seiler | |
| 2018/0181365 A1* | 6/2018 | Winton | B60Q 3/80 |
| 2018/0300101 A1* | 10/2018 | Liu | G06F 3/0488 |
| 2018/0356892 A1 | 12/2018 | Shim et al. | |

OTHER PUBLICATIONS

The United States Patent and Trademark Office, International Search Report in International Application No. PCT/US2020/035410 (dated Sep. 2, 2020).

The United States Patent and Trademark Office, Written Opinion in International Application No. PCT/US2020/035410 (dated Sep. 2, 2020).

* cited by examiner

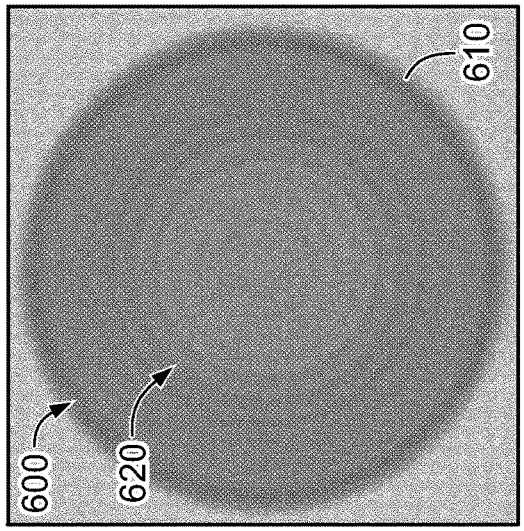
FIG. 12A
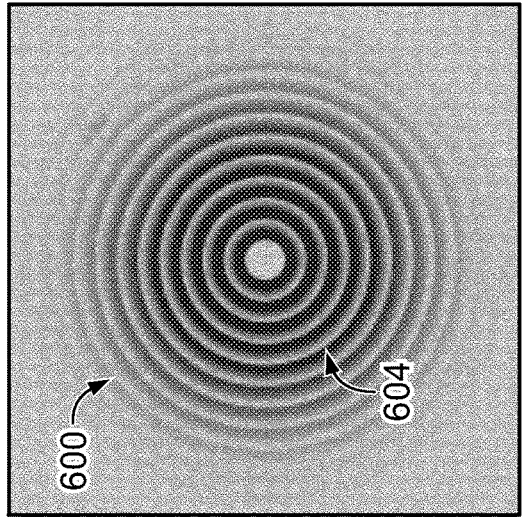
FIG. 12B
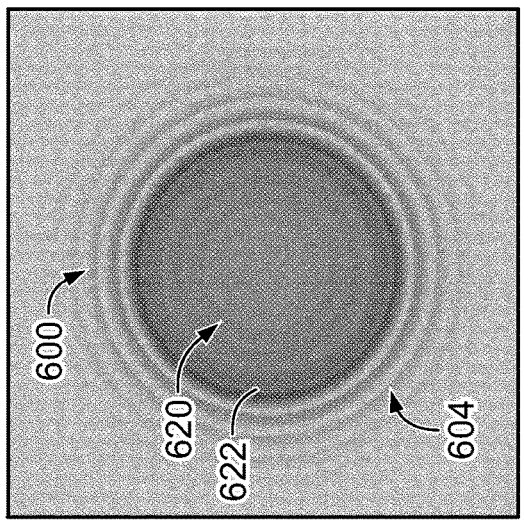
FIG. 11A
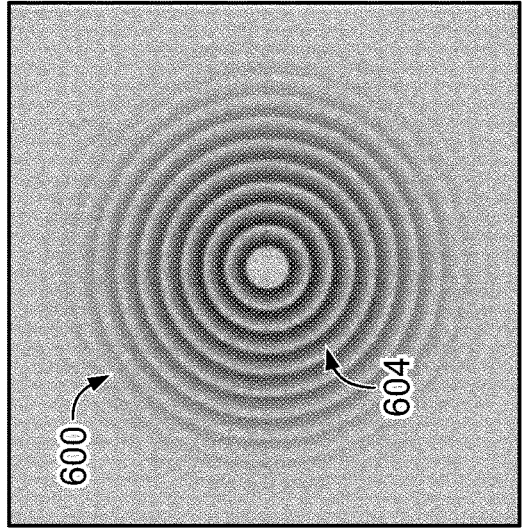
FIG. 11B
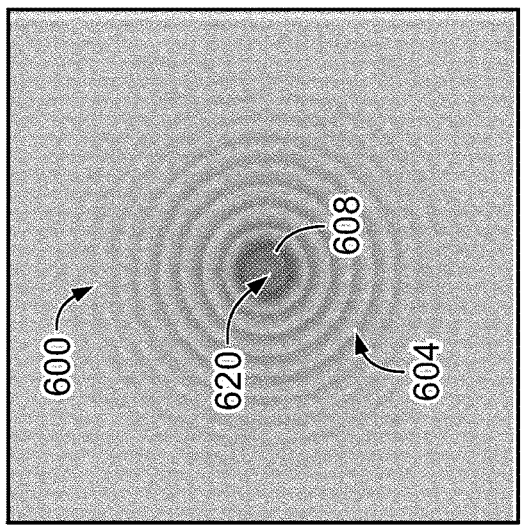
FIG. 10A
FIG. 10B

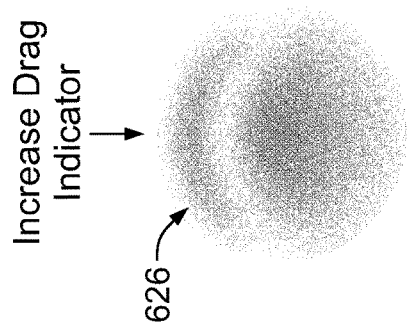
FIG. 13
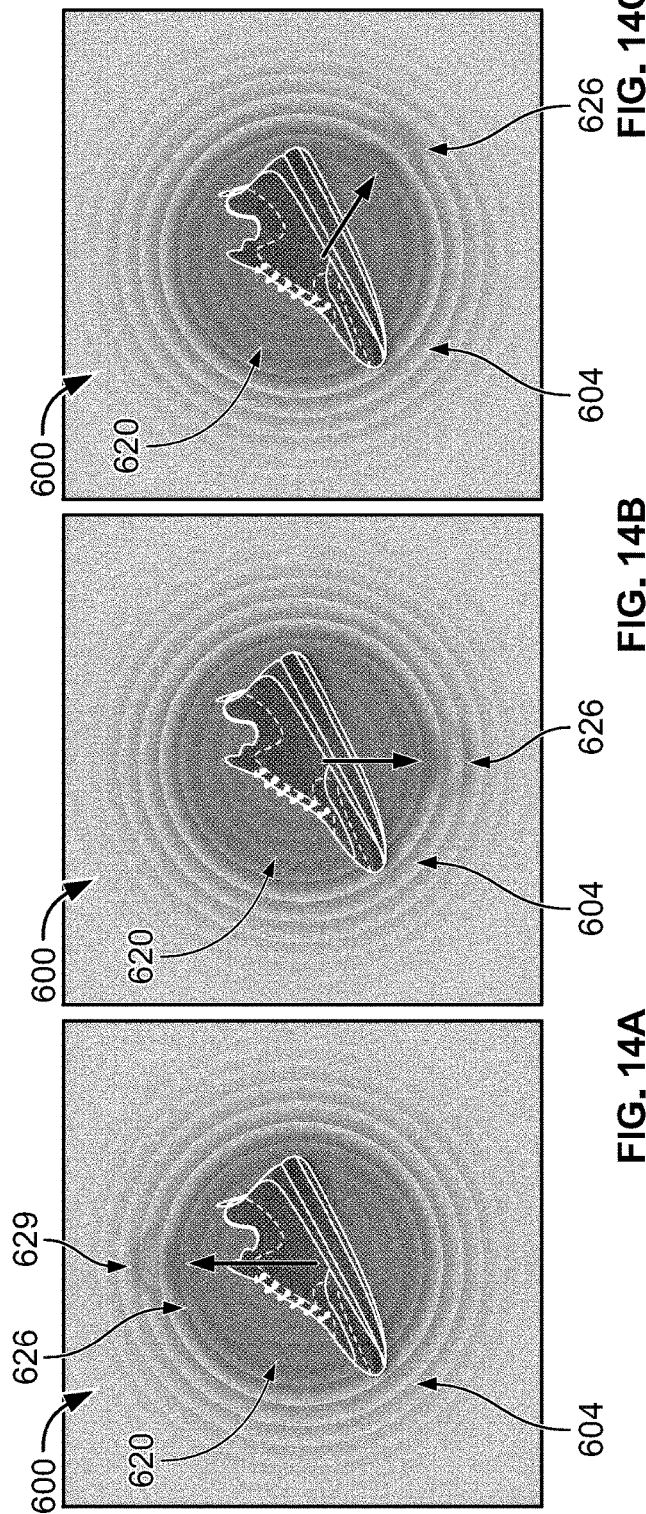
FIG. 14A
FIG. 14B
FIG. 14C

GRAPHICAL USER INTERFACE FOR CONTROLLING HAPTIC VIBRATIONS

CROSS-REFERENCE TO RELATED APPLICATION

This application claims the benefit of U.S. Provisional Application No. 62/855,860, filed on May 31, 2019, the contents of which are incorporated herein by reference in their entirety.

TECHNICAL FIELD

This application generally relates to controlling wearable haptic devices and more specifically to a graphical user interface for enabling user control of vibrations produced by the wearable haptic device.

BACKGROUND

Consumers of multi-media entertainment are seeking methods of heightened multi-sensory immersion. Existing systems for providing audio immersion include use of a subwoofer to feel the low tones of music and to improve the audio of a motion picture or a video game, and the use of surround sound to immerse the user in a more entertaining experience. However, aside from audio content, these methods do not provide a multi-sensory stimulation while in a virtual reality or other audio-visual scenario. Moreover, sub-woofers, in particular, are not convenient for users that prefer experiencing multi-media entertainment while "on the go," as the physical size of sub-woofer devices prevent portability. Also, subwoofers produce sound and vibrations that carries beyond the user, potentially disturbing others in proximity (e.g. family members or neighbors). On the other hand, existing portable devices, such as conventional earphones, are not capable of providing the same low frequency effect as sub-woofers.

The addition of tactile or haptic stimulation to existing systems for audio and/or audio-visual immersion can provide multi-sensory immersion and make an entertainment experience even more enjoyable. For example, vibrations generated based on audio signals for a musical piece can be synchronized with the audio signals to provide an enhanced musical experience where the user both hears and feels the music. Some existing haptic devices are separate from the audio/visual output devices and therefore, require separate components to produce synchronized operation with the rest of the multi-media experience. For example, haptic stimulation may be provided through wearable haptic devices that are connected to the audio or audio-visual system via a wired or wireless connection. In some cases, a wireless connection may be preferred so that the user can experience multi-sensory immersion while on the go or from any location. One existing solution embeds the haptic devices inside footwear, such as, for example, shoes or an insole designed to be placed inside pre-existing shoes, and uses a short-range wireless communication technology (such as, e.g., Bluetooth®) to transmit audio signals to and/or between the haptic devices.

Most haptic devices provide a controlled haptic experience, or vibrational intensity, that is not user-configurable, while others allow users to select between preset intensity settings, such as, e.g., high, low, and/or medium. For example, the latter type of haptic device may include a remote control device with buttons or switches for turning the device one and/or off and for selecting one of the preset intensity settings. However, such limited options fall short for users looking for a customized haptic experience.

Accordingly, there is still a need in the art for a haptic device with a user interface that offers a customizable haptic experience.

SUMMARY

The invention is intended to solve the above-noted problems by providing systems and methods that are designed, among other things, to provide a user-customizable haptic experience when using a wearable haptic device or other vibrational device. Example embodiments include a graphical user interface (GUI) presented on an electronic device for controlling the intensity of an output generated by a haptic device. The GUI can be configured to visually illustrate a user-selected change in intensity level as the actual intensity level of the haptic device changes accordingly. According to embodiments, the GUI can be configured to display up to four layers of graphical objects, each layer dynamically responding to a touch input for changing the vibrational intensity level of the haptic device. For example, one of the graphical objects can be an intensity indicator that radially adjusts in size as the touch input moves across the touchscreen to indicate the user-selected change in intensity level. At the same time, the electronic device can communicate with the haptic device to change its vibrational intensity level to the intensity level associated with the touch input.

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

FIGS. 10A through 12B illustrate various states of the first and second graphical layers indicating different user selections in accordance with embodiments.

FIG. 13 illustrates a first graphical object for forming a third graphical layer of the GUI shown in FIG. 6 in accordance with embodiments.

FIGS. 14A through 14C illustrate various states of the first graphical object of the third graphical layer for indicating different user inputs in accordance with embodiments.

DETAILED DESCRIPTION OF EXAMPLE EMBODIMENTS

Figure 1:
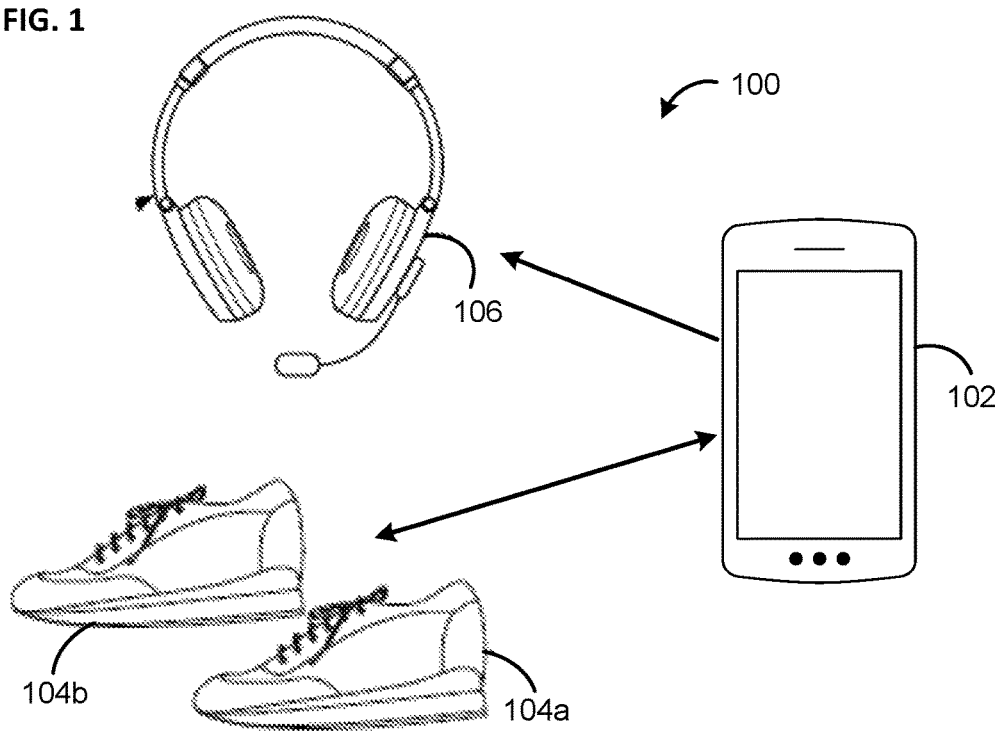
FIG. 1 is a diagram of an exemplary entertainment system in accordance with embodiments.

While the invention may be embodied in various forms, the Figures show and this Specification describes some exemplary and non-limiting embodiments, with the understanding that the present disclosure is to be considered an exemplification of the invention and is not intended to limit the invention to the specific embodiments illustrated. Also, not all of the depicted or described components may be required, and some embodiments may include additional, different, or fewer components. The arrangement and type of the components may vary without departing from the spirit or scope of the claims set forth herein.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects Bluetooth® technology is commonly used for many wireless applications between portable and computing devices and the like. For example, it is increasingly being used in domestic applications for functions such as streaming or playing back audio and/or video data and other multi-media applications such as gaming using portable gaming devices. Thus, various embodiments described herein refer to operation in accordance with Bluetooth. However, the general principles described herein can be applied to devices and systems operating according to other wireless communications protocols, such as, for example, Wi-Fi, Zigbee, etc.

Various embodiments provide a graphical user interface (GUI) configured to enable user control of the intensity of an output generated by a haptic device, the GUI being presented on an electronic device that is in wired or wireless communication with the haptic device. The GUI can visually illustrate a change in intensity level as the actual intensity level of the haptic device changes. In certain embodiments, the GUI can be configured to display four graphical layers, each layer comprising one or more graphical objects configured to dynamically respond to a touch input for changing the vibrational intensity level of the haptic device. At the same time, the electronic device can cause the haptic device to change its vibrational intensity level to a new intensity level associated with the touch input. In one exemplary embodiment, the first graphical layer includes a vibrational intensity scale with intensity level markers for representing the different intensity levels of the haptic device, and the second graphical layer includes a vibrational intensity indicator with an initial size corresponding to the intensity level marker that represents a currently selected intensity level of the haptic device. In response to detecting a touch input that moves from a first location on top of the vibrational intensity indicator to a second location corresponding to a second intensity level marker, the intensity indicator can adjust in size to correspond to the second marker.

FIG. 1 illustrates an exemplary multi-sensory entertainment system 100 configured to enhance an entertainment experience (e.g., a video game, a movie, a musical piece, etc.) provided by the system 100, in accordance with embodiments. According to certain aspects, the system 100 enhances the entertainment experience by synchronizing the delivery of audio and/or video content with the delivery of haptic content, as perceived by the user. As shown, the system 100 includes an electronic device 102 communicatively coupled, via a wired or wireless connection, to one or more haptic devices 104a, 104b for delivering haptic content to the user and at least one audio device 106 for delivering audio content to the user.

Figure 6:
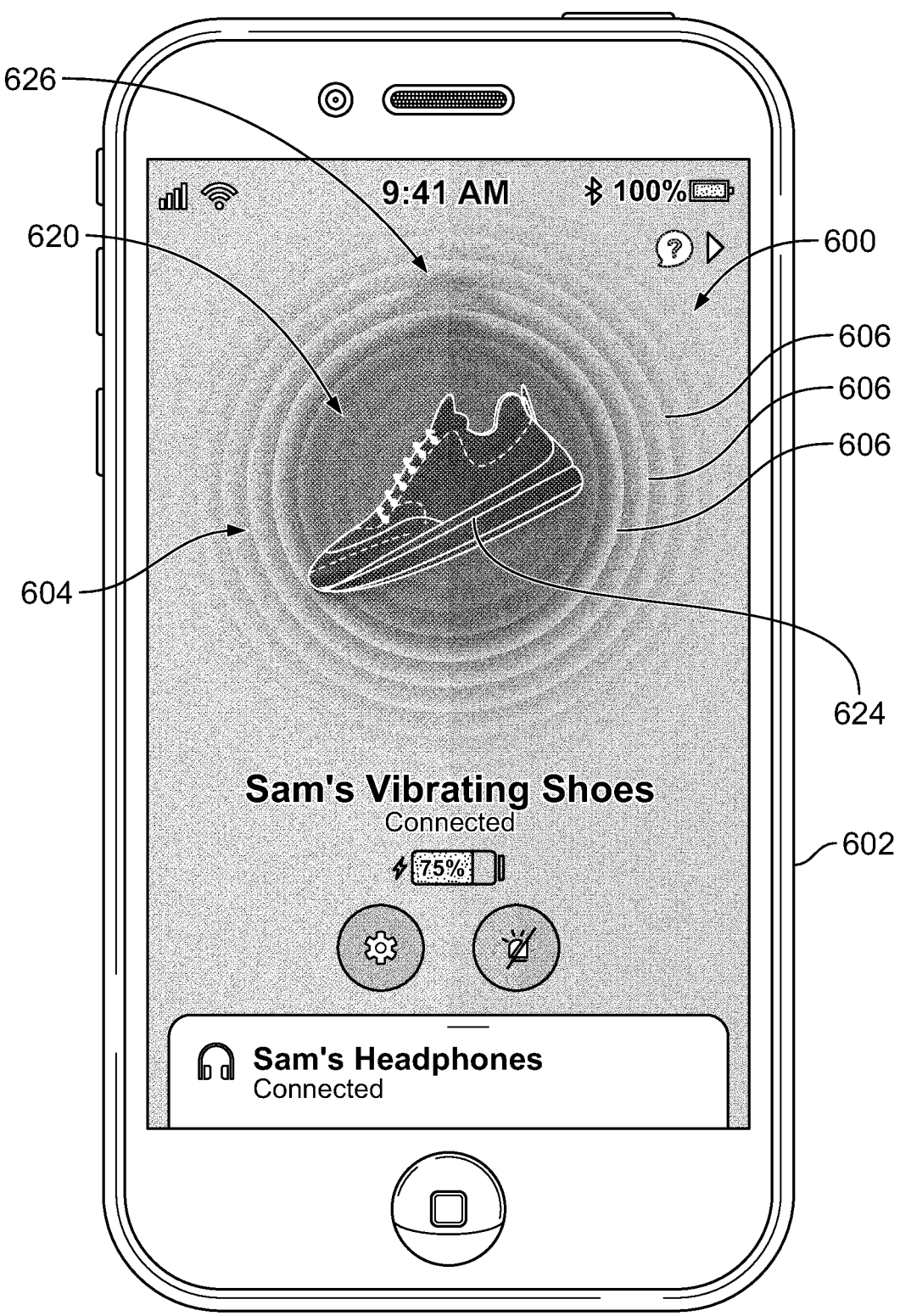
FIG. 6 is a screenshot of an exemplary graphical user interface (GUI) presented on an electronic device in accordance with embodiments.

According to embodiments, the electronic device 102 is configured to provide a graphical user interface (GUI) (e.g., GUI 600 as shown in FIG. 6) for controlling an output generated by the haptic devices 104a and 104b. The GUI enables a user to customize a vibrational intensity level of the haptic output through selection and/or manipulation of one or more graphical icons, objects, or other depictions displayed on a display screen of the electronic device 102. In addition, the GUI can be configured to visually illustrate a change in vibrational intensity level resulting from, or requested by, a given user input by causing the various graphical depictions to dynamically respond to the user input, as described in more detail herein with respect to FIGS. 6-19. As an example, one graphical depiction may be an intensity indicator that adjusts in radial size as the user input (e.g., touch input) moves across the display screen (e.g., touchscreen). The size of the indicator may correspond to, or indicate, a selected intensity level for the haptic devices 104a and 104b. As the intensity indicator dynamically adjusts in size in response to the user input, the haptic devices 104a and 104b may likewise adjust (e.g., increase or decrease) a vibrational intensity level of the haptic output provided to the user, so that the intensity of the haptic output matches the selected intensity level displayed on the GUI.

According to embodiments, the electronic device 102 may be any type of computing device capable of displaying the GUI described herein and interfacing with the haptic devices 104a and 104b, including, for example, a mobile communication device (e.g., a smart phone or portable telephone) or any other type of mobile computing device (e.g., a tablet or PDA), a personal computer (e.g., laptop or desktop), and/or a video gaming device (e.g., a handheld gaming device). In a preferred embodiment, the electronic device 102 includes a display screen (e.g., display screen 302 shown in FIG. 3) for displaying the GUI and a touch input device (e.g., touch-sensitive panel 304 shown in FIG.

3) overlaying at least a portion of the display screen to receive touch inputs indicating user selections associated with the GUI.

In embodiments, each of the haptic devices 104a and 104b can include one or more haptic transducers (such as, e.g., haptic transducers 402 shown in FIG. 4) configured to convert audio content into haptic signals and based thereon, generate vibrations or tactile sensations for delivery to the user. The audio content may be an audio stream that constitutes standalone audio content (such as, for example, a musical piece), or is part of audio-visual content (such as, for example, a video game, a movie, or other video-based content). The audio content may be received from the electronic device 102 and/or a separate audio source within the system 100 (not shown), such as, e.g., an audio device (e.g., a stereo system, surround sound system, radio, audio receiver, etc.), a personal media player (e.g., MP3 player) or any other type of media player (e.g., a DVD or Blue-ray player), and/or a video gaming device (e.g., a gaming console, video game controller, or handheld gaming device).

The haptic devices 104a and 104b may be any type of wearable haptic device or other haptic device configured to apply vibrations to a user's body that may be perceived or felt by a user when the haptic devices 104a and 104b are placed in close proximity to, or worn by, the user. In some embodiments, each of the haptic devices 104a, 104b can be embodied as a separate wearable piece, such as, for example, a piece of footwear (e.g., a shoe, a sock, or an insole designed to be placed inside a shoe or sock), a glove, an armband, a wristband or bracelet, an ankle band or anklet, etc. For example, FIG. 1 depicts the haptic devices 104a and 104b as individual shoes or footwear. In such cases, one or more haptic transducers may be placed within or adjacent to an insole of each shoe, or otherwise positioned for placement against a foot of the user, for example, as shown and described in commonly-owned U.S. Pat. No. 8,644,967, the contents of which are incorporated by reference herein in its entirety. As another example, the haptic devices 104a and 104b may be implemented as individual pods or haptic units configured for placement at, or attachment to, various locations on the user's body (e.g., chest or torso, back, each arm, each leg, etc.), with each haptic unit including one or more haptic transducers, for example, as shown and described in commonly-owned U.S. Pat. No. 10,034,091, the contents of which are incorporated by reference herein in its entirety.

While two devices 104a and 104b are shown in FIG. 1, in other embodiments, the system 100 may include more or less than two haptic devices. For example, in one embodiment, the haptic devices 104a, 104b can be integrated into a single wearable piece, such as, for example, a shirt, a vest, a belt, pants, or other piece of clothing having multiple haptic devices or transducers integrated into different areas of the piece for placement against different areas of the body.

In embodiments, the audio device 106 can be configured to audibly output or play the audio content associated with the entertainment experience in synchrony with the haptic content generated by the haptic devices 104a and 104b. The audio device 106 can be any type of audio listening or playback device, including, for example, headphones, earphones, headsets, or loudspeakers. In some embodiments, the audio device 106 can be coupled to an audio system of the electronic device 102 (such as, e.g., audio system 306 shown in FIG. 3) to receive the audio content therefrom.

According to embodiments, data content may be exchanged between the electronic device 102 and one or more of the audio device 106 and the haptic devices 104a and 104b. The data content may be control data for controlling operation of the electronic device 102, the haptic devices 104a and 104b, and/or the audio device 106. For example, the data content may indicate whether the audio content transmitted to haptic devices 104a, 104b is intended for the first haptic device 104a, the second haptic device 104b, or both devices. In some cases, the data content may include instructions regarding specific tactile sensations or vibrations to impart to the user through the haptic devices 104a and 104b (e.g., an earthquake, an engine rumbling, tires on a gravel road, etc.). In a preferred embodiment, the data content includes instructions indicating a currently-selected vibrational intensity level and may be transmitted from the electronic device 102 to the haptic devices 104a and 104b in response to user inputs received via the GUI displayed by the electronic device 102. In some cases, the data content may indicate what data, if any, should be captured by the haptic transducers included in the haptic devices 104a and 104b, and sent back to the electronic device 102 or other component of the system 100.

In some embodiments, the system 100 may include a separate data source (not shown) for providing certain data content, such as, e.g., a video gaming device, a personal computer, a mobile communication device or other mobile computing device, and/or a personal media player. In some cases, the separate data source and the separate audio source may be a common unit included in the system 100 for providing both audio and data content to the electronic device 102, the haptic devices 104a and 104b, and/or the audio device 106.

In a preferred embodiment, at least one of the wearable haptic devices 104a and 104b is configured to communicate wirelessly with the electronic device 102 using short-range wireless communication, such as, for example, a Bluetooth® communications protocol, or other low latency wireless technology, for example, as shown and described in commonly-owned U.S. patent application Ser. No. 16/333,438, the contents of which are incorporated by reference herein in its entirety. In some cases, only one of the devices, such as, for example, a first wearable haptic device 104a, may be in wireless communication with the electronic device 102, while a second wearable haptic device 104b may communicate with the electronic device 102 via or through the first wearable haptic device 104a. For example, the first and second haptic devices 104a and 104b may communicate with each other via a separate wireless connection (not shown), while the first device 104a communicates directly with the electronic device 102 on behalf of the second device 104b and relays information received from the electronic device 102 to the second device 104b. In other embodiments, each of the haptic devices 104a and 104b may have an independent wireless connection to the electronic device 102.

Figure 2:
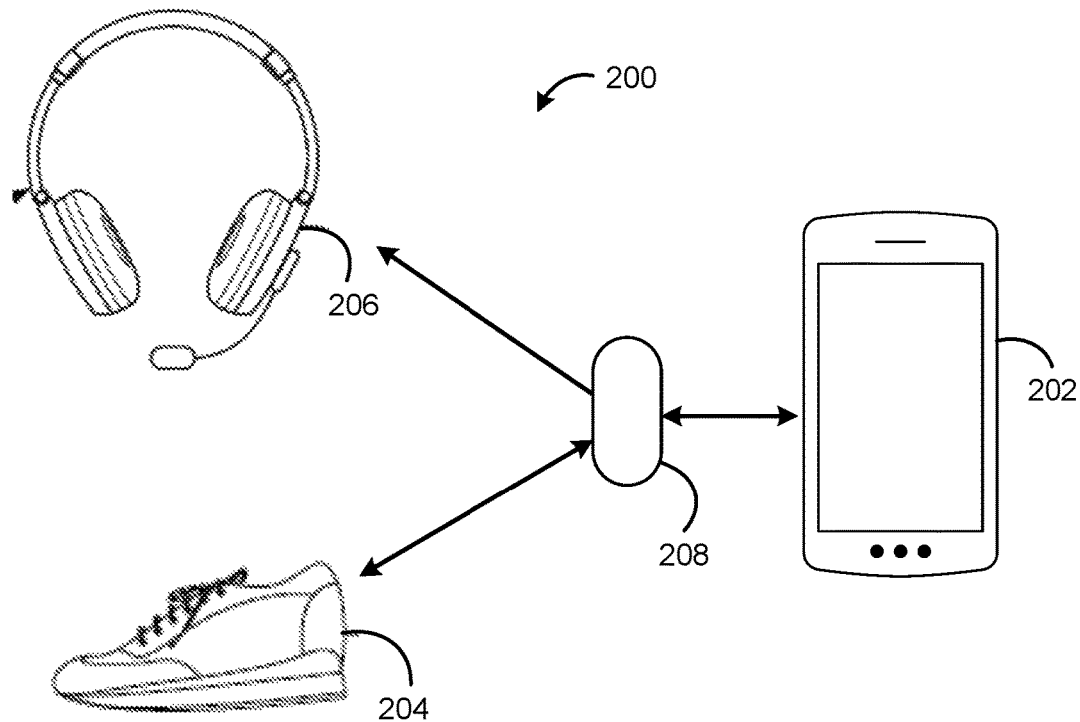
FIG. 2 is a diagram of another exemplary entertainment system in accordance with embodiments.

FIG. 2 illustrates another exemplary entertainment system 200 for enhancing an entertainment experience by synchronizing delivery of audio content with delivery of haptic content, in accordance with embodiments. The system 200 includes an electronic device 202, one or more haptic devices 204, and an audio device 206, each of which is substantially similar to the corresponding components of system 100. However, the system 200 also includes an intermediary control device 208 that is communicatively coupled between the electronic device 202 and the audio device 206, as well as between the electronic device 202 and the haptic device(s) 204. In embodiments, the control device 208 may be a hardware accessory that is sold with the wearable haptic device(s) 204 for implementing the entertainment system 200. For example, the control device 208 may be packaged as a dongle, puck, or other small electronic device with appropriate input and output devices and a wireless transceiver that is compatible with wireless transceiver(s) of the haptic device(s) 204.

One exemplary use case of the systems 100 and/or 200 may be a video gaming scenario in which audio content associated with a video game is received from a gaming console (not shown). In some cases, the electronic device 102/202 may receive the audio content from the gaming console and provide the same to the haptic devices 104/204 for delivery to the user's feet as haptic vibrations and to the audio device 106/206 for delivery to the user's ears as audible content. In other cases, the gaming console may provide the audio content directly to the haptic devices 104/204 and audio device 106/206, and the electronic device 102/202 may be configured only for providing the graphical user interface for controlling outputs and/or settings of the haptic devices 104/204 and/or the audio device 106/206. In the system 200, the gaming console may alternatively provide the audio content to the control device 208 for dissemination to the devices 204 and 206. As will be appreciated, the gaming console may be connected to a display screen for displaying video content in association with the audio content. Said display screen may be the display screen of the electronic device 102/202, or a separate display screen (not shown) (e.g., a television, computer monitor, laptop screen, tablet screen, etc.) included in the entertainment system.

Figure 3:
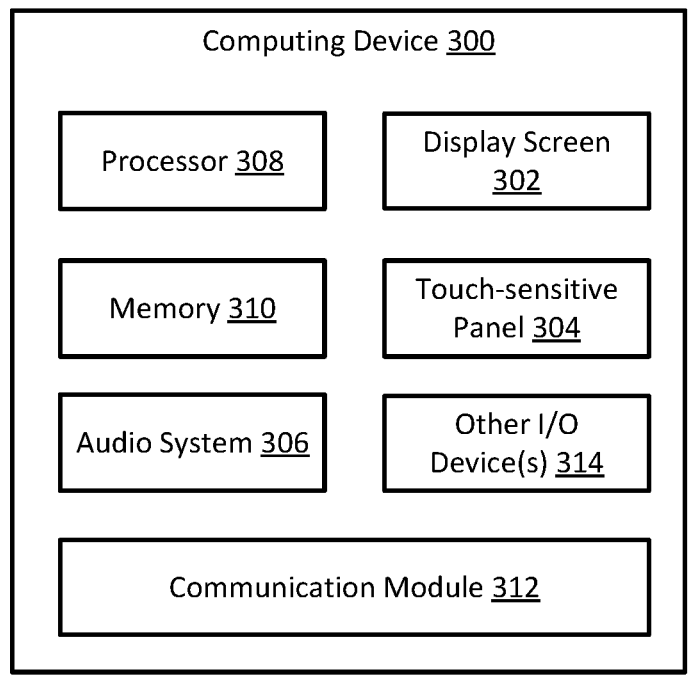
FIG. 3 is a block diagram of an exemplary electronic device included in the entertainment systems of FIGS. 1 and/or 2 in accordance with embodiments.

FIG. 3 illustrates a simplified block diagram of an exemplary computing device 300 of the entertainment system 100 and/or 200. In embodiments, one or more computing devices like computing device 300 may be included in the system 100/200 and/or may constitute the electronic device 102. Computing device 300 may be configured for performing a variety of functions or acts, such as those described in this disclosure (and shown in the accompanying drawings), including generating and displaying a graphical user interface (e.g., GUI 600 in FIG. 6) for controlling an output of one or more haptic devices (e.g., haptic devices 104/204).

The computing device 300 may include various components, including for example, one or more processors 308, memory 310, communication module 312, audio system 306, display screen 302, touch-sensitive surface 304, and one or more other input/output (I/O) devices 314, all communicatively coupled by system bus, network, or other connection mechanism (not shown). It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, one or more features of the computing device 300 may be physically remote and may be communicatively coupled to the computing device, via the communication module 312, for example.

Processor 308 may include a general purpose processor (e.g., a microprocessor) and/or a special purpose processor (e.g., a digital signal processor (DSP)). Processor 308 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 310 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 310 includes multiple kinds of memory, particularly volatile memory and non-volatile memory.

The memory 310 may be computer readable media on which one or more sets of instructions can be embedded, including computer program modules or other software which, when executed by processor 308, cause the processor 308 to implement one or more techniques of the present disclosure. For example, the instructions may embody one or more of the methods described herein (such as, e.g., method 500 shown in FIG. 5). The instructions may reside completely, or at least partially, within any one or more of the memory 310, the computer readable medium, and/or within the processor 308 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

As shown, computing device 300 includes display screen 302, touch-sensitive panel 304, an audio system 306, and one or more other I/O devices 314 (e.g., peripherals) to facilitate interaction with a user of the device. The other I/O devices 314 may include input components, such as, for example, a keyboard, a keypad, a mouse, and/or a camera, and output components, such as, for example, a haptic feedback system for generating tactile outputs on the device 300. Some I/O devices 314 may be internal to the computing device 300, while others may be external and connected to the computing device 300 either wirelessly or via connection cable, such as through a universal serial bus port. In some cases, the I/O devices 314 further include a data port (such as, e.g., a mini-universal serial bus (USB port), a Lightening connector port, etc.) for receiving data from and/or transmitting data to an external data source or other device coupled to the data port.

The display screen 302 may include LCD (liquid crystal display) technology, LPD (light emitting polymer display) technology, LED (light emitting diode) technology, or other display technologies for displaying a visual output on the computing device 300, such as the graphical user interface described herein (e.g., GUI 600 of FIG. 6) or other graphics (e.g., text, icons, objects, video, or any combination thereof). The touch-sensitive panel 304 may be a touch-sensitive surface, sensor, or set of sensors that accepts an input from the user based on tactile contact detected using capacitive, resistive, infrared, surface acoustic wave, or other touch-sensitive technologies. As an example, a point of contact between the touch-sensitive surface 304 and the user may correspond to a finger of the user or a stylus.

In embodiments, the touch-sensitive surface 304 may be disposed over, or on top of, at least a portion of the display screen 302 to collectively form a touchscreen, or touch-sensitive display system. In such cases, the display screen 302 may operate as an output interface between the user and the device, while the touch-sensitive panel 304 may operate as an input interface between the user and the device. For example, the touchscreen can be configured to detect contact or touch input on the touch-sensitive surface 304, or a movement or breaking thereof, and convert the detected contact into a visually-presented interaction with user-interactive graphics displayed on the display screen 302 (e.g., as part of the GUI 600).

The audio system 306 may include a sound speaker, microphone, audio player, audio circuitry, and/or other components for providing an audio interface between the user and the computing device 300. In some embodiments, the audio system 306 may generate the audio content that is provided to the haptic devices and/or audio device. In some cases, the audio system 306 further includes an audio socket (such as, e.g., a 3.5 millimeter audio socket) configured to receive a corresponding audio plug (such as, e.g., a 3.5 millimeter audio jack). For example, the audio socket may be used to couple an external audio device (e.g., audio device 106 of FIG. 1) to the audio system 306, or to receive an audio stream from an external audio source.

Communication module 312 may be configured to allow the device 300 to communicate with one or more devices (or systems) according to one or more protocols. For example, the communication module 312 may comprise one or more radio transceivers configured for communicating with a cellular network, a wireless local area network, a wide area network, a Bluetooth® network, and/or other personal area networks (e.g., RFID, NFC, etc.). In a preferred embodiment, the communication module 312 includes at least one wireless transceiver configured to transmit audio and/or data content to one or more haptic devices (such as, e.g., haptic devices 104a and 104b of FIG. 1) and/or receive data content therefrom. The wireless transceiver may also be used to transmit audio and/or data content to one or more audio devices (such as, e.g., audio device 106 of FIG. 1) and/or receive data content therefrom. As an example, the wireless transceiver may be a Bluetooth® transceiver configured to operate according a Bluetooth® communications protocol. Though not shown, the communication module 312 can further include antennas, modems, and other wireless communication circuitry for carrying out wireless communications.

Figure 4:
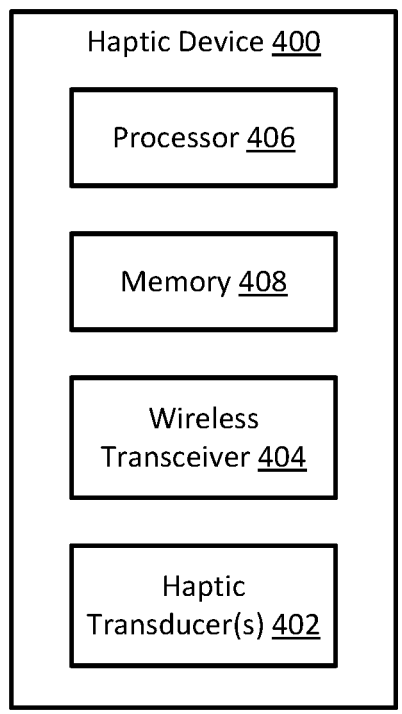
FIG. 4 is a block diagram of an exemplary haptic device included in the entertainment systems of FIGS. 1 and/or 2 in accordance with embodiments.

FIG. 4 illustrates an exemplary external haptic device 400 configured to wirelessly receive audio data, such as, e.g., audio content associated with the entertainment system 100, and convert the audio data into haptic signals, in accordance with embodiments. The haptic device 400 may be configured to apply the haptic signals to the user's body and may be included in at least one of the wearable haptic devices 104a and 104b shown in FIG. 1 and/or the wearable haptic device 204 shown in FIG. 2. The haptic device 400 can be further configured to facilitate delivery of the haptic signals to the user's body in synchrony with delivery of related audio content to the user's ears via, for example, the audio device 108 shown in FIG. 1. In embodiments, the haptic device 400 can be implemented on one or more integrated circuits.

As shown, the haptic device 400 includes one or more haptic transducers 402 for converting audio data into haptic signals. The haptic transducer(s) 402 may be positioned within the haptic device 400 so as to apply vibrations or tactile sensations to the user's body. For example, in the case of haptic footwear, such as, wearable haptic devices 104a and 104b, the haptic transducer(s) 402 may be placed in an insole of the footwear or otherwise against a foot of the user. In embodiments, the haptic transducer 404 can be similar to the haptic transducer described in co-owned U.S. patent application Ser. No. 15/659,349, the contents of which are incorporated by reference herein in its entirety.

The haptic device 400 further includes a wireless transceiver 404 for facilitating a wireless connection between the haptic device 400 and external device, such as computing device 300 and/or electronic device 102. In embodiments, a bi-directional communications channel can be established between the wireless transceiver 404 and a wireless transceiver of the communication module 312 in computing device 300, in order to receive audio and/or data content from the computing device 300 and send data content to the computing device 300. The wireless transceiver 404 can be configured for the same type of wireless communications technology as the wireless transceiver of the communication module 312 in order to establish this channel. For example, in a preferred embodiment, the wireless transceiver 404 is a Bluetooth® transceiver, like the wireless transceiver of computing device 300.

In embodiments, the haptic device 400 may receive, via the wireless transceiver 404, data content from the computing device 300 that comprises instructions to adjust a vibrational intensity level of the haptic transducer(s) 402 within the device 400. In response, the haptic device 400 may alter an intensity level of the vibrations produced by the haptic transducers 402, for example, by adjusting a magnitude of the haptic signals being generated based on the audio content.

As shown in FIG. 4, the haptic device 400 includes a processor 406 for controlling operation of the haptic device 400 and processing audio and/or data content received from the computing device 300. The processor 406 can include one or more of a baseband processor, an audio processor, a data processor, a central processing unit, a microprocessor, a microcontroller, a programmable logic array, an application-specific integrated circuit, a logic device, or other electronic device for processing, inputting, outputting, manipulating, storing, or retrieving data. The processor 406 can be configured to execute software stored in a memory 408 of the haptic device 400.

The memory 408 can comprise one or more of a data storage device, an electronic memory, a nonvolatile random access memory (e.g., RAM), flip-flops, a non-transitory computer-writable or computer-readable storage medium, a magnetic or optical data storage device, or other electronic device for storing, retrieving, reading, or writing data. The memory 408 can store one or more computer program modules, computer executable instructions, or other software for execution by the processor 406. For example, in embodiments, the memory 408 may store one or more sets of instructions or software for carrying out methods or operations of the haptic device 400 as described herein.

Figure 5:
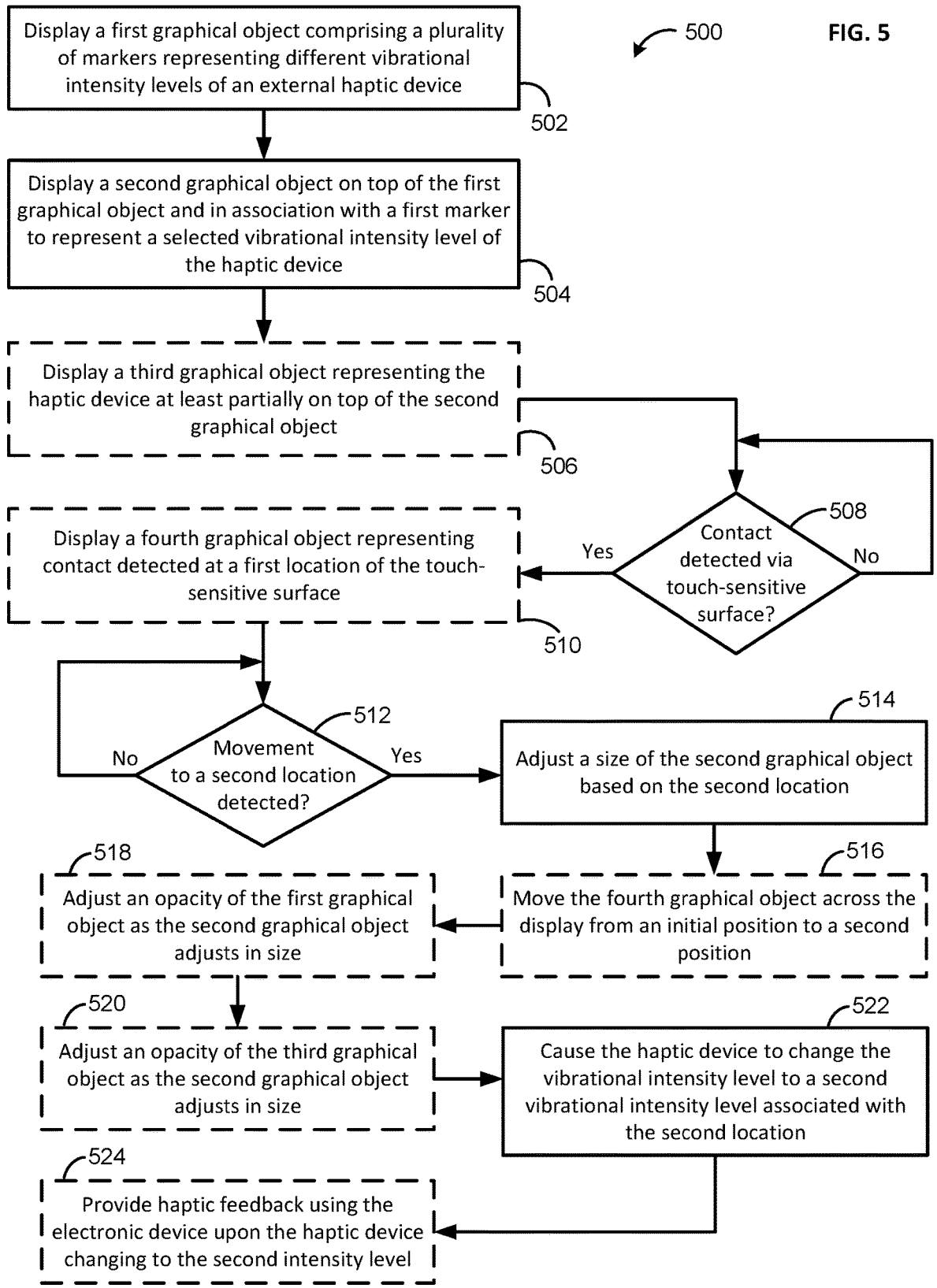
FIG. 5 is a flow diagram of an exemplary method for controlling an output generated by a haptic device in accordance with embodiments.

FIG. 5 illustrates an example process or method 500 of controlling an output generated by a haptic device, in accordance with embodiments. The method 500 can be carried out by a computing device, such as, for example, computing device 300 shown in FIG. 3 and/or electronic device 102 shown in FIG. 1. As an example, the method 500 may be implemented, at least in part, by a processor of the computing device (e.g., processor 308 shown in FIG. 3) executing a software application stored in a memory of the computing device (e.g., memory 310 shown in FIG. 3). Further, to carry out the operations of the method 500, the computing device can interact with one or more external devices communicatively coupled thereto, such as, for example, one or more external haptic devices (e.g., wearable haptic devices 104a and 104b shown in FIG. 1) and/or an external audio device (e.g., audio listening device 106 shown in FIG. 1), as well as employ one or more internal devices, such as, e.g., a display screen (e.g., display screen 302 shown in FIG. 3) and a touch-sensitive device (e.g., touch-sensitive panel 304 shown in FIG. 3).

In the following paragraphs, the method 500 will be described with reference to FIG. 6, which illustrates an exemplary graphical user interface (GUI) 600 generated by and displayed on an exemplary electronic device 602, as well as FIGS. 7-19, which demonstrate various states of the interactive graphics included in the GUI 600. The electronic device 602 may be similar to computing device 300 of FIG. 3 and/or electronic device 102 of FIG. 1. For example, the electronic device 602 includes a touch-sensitive surface overlaying a display screen, or a touchscreen, and is configured to display the graphical user interface 600 on the display screen, receive or detect touch inputs and other contact-based user inputs via the touch-sensitive surface, and translate the user inputs into visual outputs or interactions with the GUI 600 that are displayed on the display screen.

The method 500 may begin at step 502 with displaying, on the display, a first graphical object comprising a plurality of intensity level markers. In embodiments, the first graphical object is an intensity scale for visually indicating the full range of intensity offered by the haptic device, and the markers visually represent the discrete vibrational intensity levels that are available for user selection. For example, as shown in FIG. 6, the graphical user interface 600 includes a substantially circular intensity scale 604 comprised of a plurality of concentrically arranged intensity level markers 606. As shown in more detail in FIG. 7, the intensity level markers 606 may be circles or rings with progressively increasing sizes, or diameters, such that the markers 606 radiate out from a center of the scale 604. The size of each marker may be configured to correlate to the vibrational intensity level represented by that marker. For example, the concentric circles 606 may progressively increase in diameter from a central circle 608, which represents a minimum vibrational intensity level of the haptic device, to an outermost circle 610, which represents a maximum vibrational intensity level of the haptic device.

Figure 7:
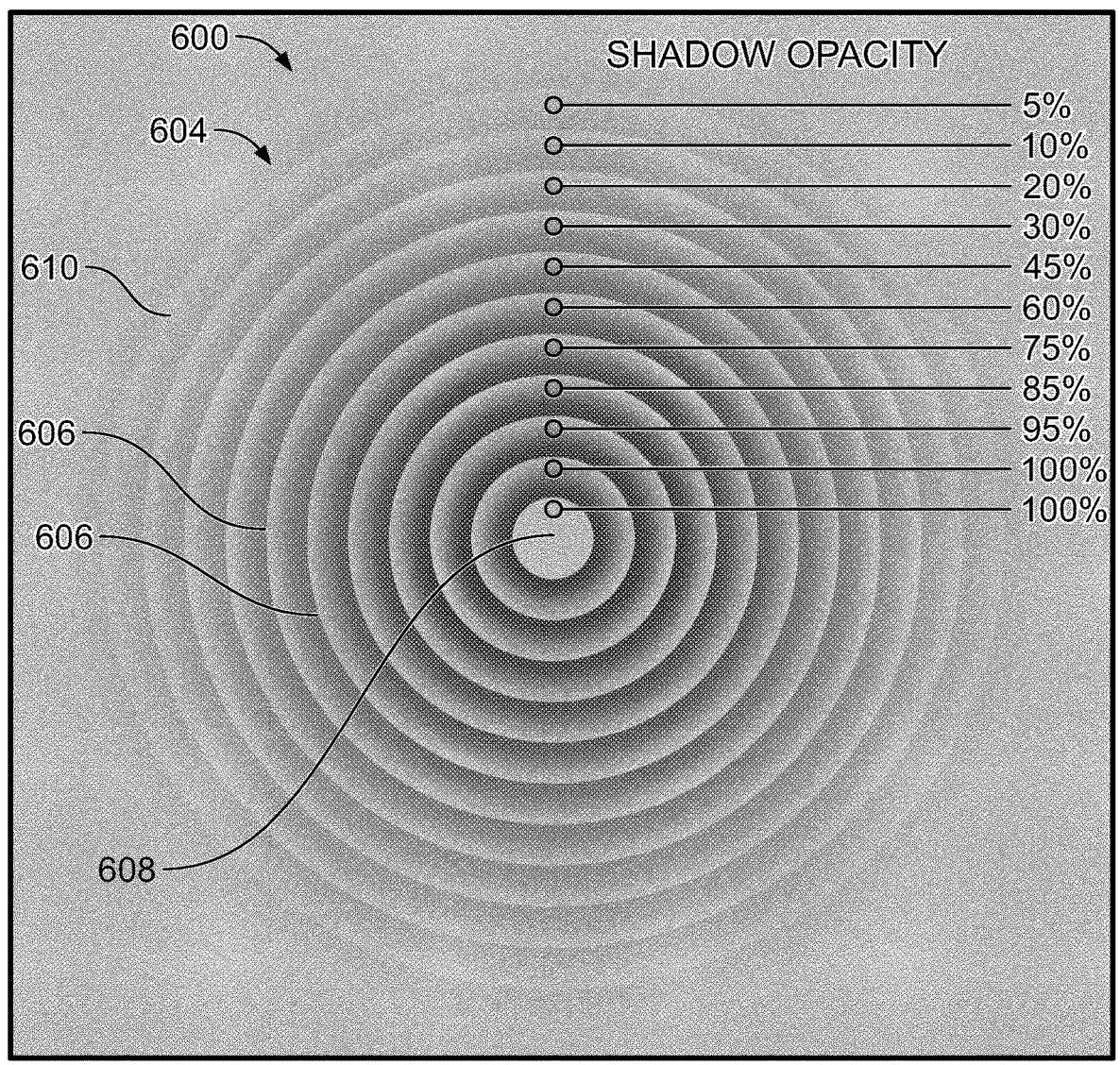
FIG. 7 illustrates a first graphical layer included in the GUI shown in FIG. 6 in accordance with embodiments.
Figure 8A:
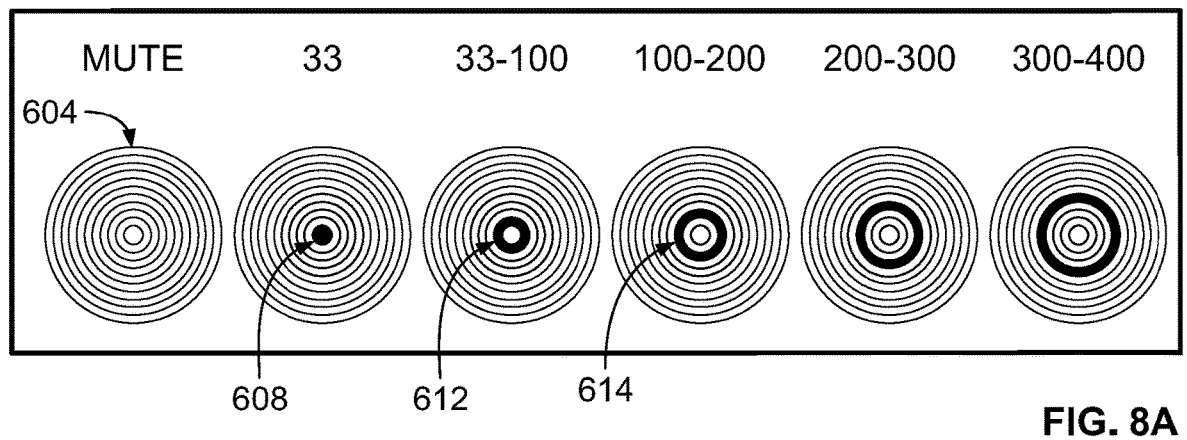
FIGS. 8A and 8B illustrate exemplary intensity levels corresponding to individual markers of the first graphical layer of FIG. 7 in accordance with embodiments.
Figure 8B:
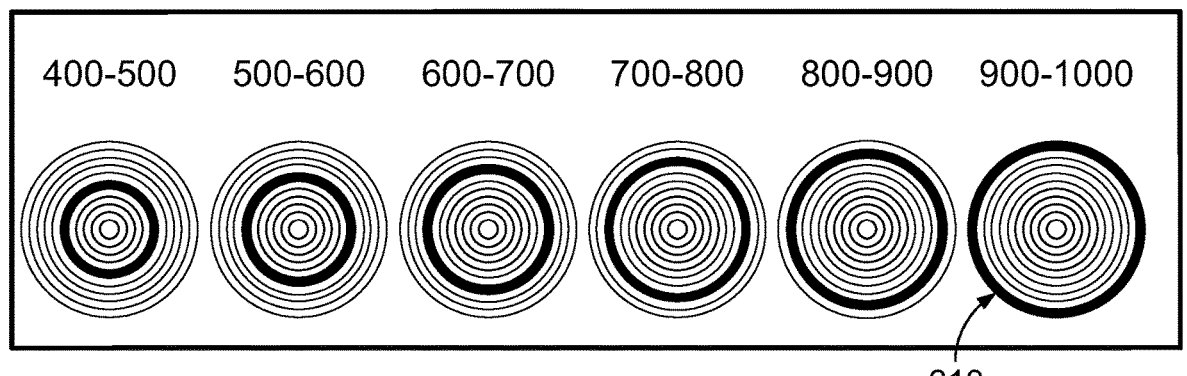

In some embodiments, the intensity scale 604 is configured to provide a substantially continuous scale, such that the user can fine-tune the vibrational intensity level of the haptic output further. For example, the intensity scale 604 may include a plurality of major steps, represented by the clearly-defined markers 606 in FIG. 7, and a plurality of minor steps (not shown) within or between each pair of adjacent markers 606. In one embodiment, the intensity scale 604 may include 11 major steps, or the rings 606, and 100 minor steps between each pair of adjacent rings 606, amounting to a total of 1000 user-selectable intensity levels. Following this example, FIGS. 8A and 8B show the various sizes of the eleven major steps or rings 606 and the intensity level value (or range of values) that corresponds to each ring 606 (or the space between that ring 606 and the next largest ring), when the intensity scale 604 ranges from zero (or mute) to 1000. More specifically, in the illustrated embodiment, the smallest or central circle 608 indicates a minimum intensity level (e.g., 33, or 0-33), a next smallest or second circle 612 indicates a second intensity level range greater than the minimum (e.g., 33-100), a third circle 614 indicates a third intensity level range greater than the second (e.g., 100-200), and so forth until the largest or outermost circle 610, which indicates a maximum intensity level range (e.g., 900-1000). As also shown, when a mute setting is selected, none of the intensity level markers 606 may be selected, so as to indicate the complete lack of haptic output.

Referring back to FIG. 7, in some embodiments, the first graphical object, or intensity scale 604, can be configured to create a radial fade aesthetic that is reminiscent of radiating vibrations or rings formed on the surface of a pond. To help create this aesthetic, the markers or rings 606 may be assigned gradually decreasing shadow opacity values from the central marker 608 out to the outermost marker 610. For example, as shown in FIG. 7, the opacity of the central ring 608 and the second ring 612 may be 100%, the opacity of the third ring 614 may be 95%, and so forth, with the opacity of the outermost marker 610 being 5%. This radial fade allows the edges of the intensity scale 604 to form smooth, visual transition into the underlying GUI 600.

While the illustrated embodiment specifically shows eleven circles or markers 606, other embodiments may include more or fewer markers, markers formed from different types of concentric shapes (e.g., squares, triangles, ovals,), and/or a different configuration or arrangement of the markers (e.g., a sliding scale wherein the markers are arranged side-by-side, a tower wherein the markers are stacked on top of each other, etc.).

Figure 9:
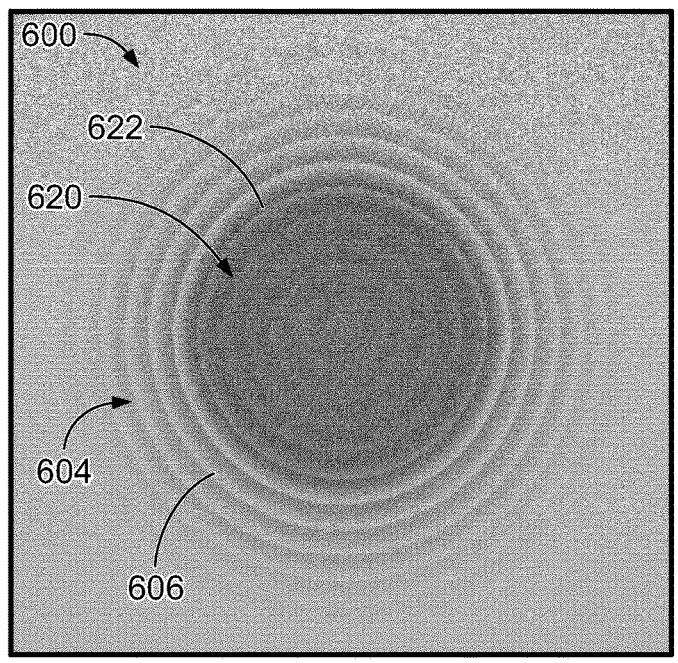
FIG. 9 illustrates a second graphical layer positioned on top of the first graphical layer shown in FIG. 7 in accordance with embodiments.

Referring back to FIG. 5, the method 500 further comprises step 504, which includes displaying, on the display, a second graphical object on top of at least a portion of the first graphical object. In embodiments, the second graphical object is an intensity indicator for visually indicating a selected vibrational intensity level, or the intensity level of a vibration or tactile sensation being currently output by the haptic device to the user. For example, as shown in FIGS. 6 and 9, the graphical user interface 600 further includes a circular intensity indicator 620 that overlays, or is placed on top of, the circular intensity scale 604. The intensity indicator 620 can be configured to have a first size that corresponds to, or aligns with, a first one of the intensity level markers 606, thus indicating the currently-selected vibrational intensity level of the haptic device. For example, in FIG. 9, the intensity indicator 620 generally matches in size or aligns with a sixth marker 622 and thus, indicates a selected intensity level within the 400-500 range.

In embodiments, a new vibrational intensity level for the haptic device can be selected by visually manipulating or adjusting the size of the intensity indicator 620 displayed in the GUI 600 until the new or second size of the indicator 620 causes the indicator 620 to be substantially aligned with a different or second intensity level marker 606. For example, starting from FIG. 11A, which shows the intensity indicator 620 at marker 622 (like FIG. 9), the intensity indicator 620 can be fluidly scaled down or reduced in size to coincide with the central or smallest marker 608, as shown in FIG. 10A, or can be fluidly scaled up or expanded in size to coincide with the largest or outermost marker 610, as shown in FIG. 12A. In embodiments, whether expanding or contracting, the intensity indicator 620 is configured to radially adjust in size by smoothly transitioning between steps and evenly scaling from one circular marker 606 to the next, until a desired intensity level is reached.

While the illustrated embodiment depicts the intensity indicator 620 as a circle disposed over the intensity scale 604, other shapes and/or arrangements are also contemplated. For example, the intensity indicator 620 could have any other shape (e.g., triangle, square, oval, star, etc.) that is capable of being aligned with or matched to at least a portion of an intended marker 606 or can otherwise indicate a selected vibrational intensity level on the intensity scale 604.

In some embodiments, the method 500 further comprises step 506, which includes displaying, on the display, a third graphical layer representing the haptic device on top of at least a portion of the second graphical object. For example, as shown in FIG. 6, the graphical user interface 600 includes a device icon 624 designed to look like a shoe to visually represent the one or more haptic device(s) coupled to the electronic device 602 (such as, e.g., wearable haptic devices 104a and 104b shown in FIG. 1). As will be appreciated, in other embodiments, the device icon 624 may have other designs depending on the nature of the haptic device. In some embodiments, the graphical user interface 600 may enter a disconnected mode when a haptic device is not detected by, or is disconnected from, the electronic device 602. In such cases, the graphical user interface 600 may appear faded or grayed out, and/or may remain inactive, until a haptic device (or shoe) is connected to the electronic device 602.

At step 508, the method 500 includes determining whether a contact, or touch input, has been detected at the touch-sensitive surface, for example, due to a user pressing a finger or stylus to the touchscreen of the electronic device 602. In some cases, the touch-sensitive surface of the electronic device 602 may be configured to specifically determine whether a first contact has been detected at a first location of the touch-sensitive surface that at least partially overlaps the second graphical object, or the intensity indicator 620. If the answer is "yes" (i.e. contact has been detected), the method 500 may continue to step 510 (or 512). If the answer is "no," the method 500 may continue to loop around step 508 until a touch input or contact is detected.

Figure 15:
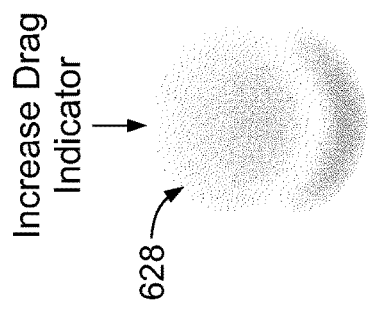
FIG. 15 illustrates a second graphical object for forming the third graphical layer in accordance with embodiments.

In some embodiments, the method 500 further comprises step 510, which includes, in response to detecting a contact at step 508, displaying, on the display, a fourth graphical object at an initial position on the graphical user interface 600 to represent the detected contact. The initial position of the fourth graphical object may correspond to the first location on the touch-sensitive surface, or the location at which the contact was detected. In embodiments, the initial position may at least partially overlap the intensity indicator 620 of the graphical user interface 600. For example, as shown in FIG. 6, the graphical user interface 600 may further include a contact indicator 626 that is disposed on top of, or overlays, at least a portion of the intensity indicator 620. In embodiments, the detected contact may indicate a user desire to adjust the vibrational intensity level of the haptic device, as described in more detail below. As shown in FIG. 6, the contact indicator 626 may also overlap at least a portion of the intensity scale 604. FIGS. 13 and 15 illustrate further examples of the fourth graphical object, as well be described in more detail below.

At step 512, the method 500 includes determining whether a movement of the contact across the touch-sensitive surface has been detected, such as, e.g., a dragging movement from the first location to a second location of the touch-sensitive surface. As an example, the dragging movement may be caused by the user continuously pressing his or her finger or stylus to the touch-sensitive surface (e.g., without lifting) while also moving the same across the touchscreen. In some cases, the touch-sensitive surface may be specifically configured to determine whether the contact detected at the first location has moved to a second location of the touch-sensitive surface that at least partially overlaps a second one of the intensity level markers 606. If the answer is "yes" (i.e. a movement was detected), the method 500 continues to step 514. If the answer is "no," the method 500 may continue to loop around step 512 until a movement is detected.

Figures 16A, 16B, 16C:
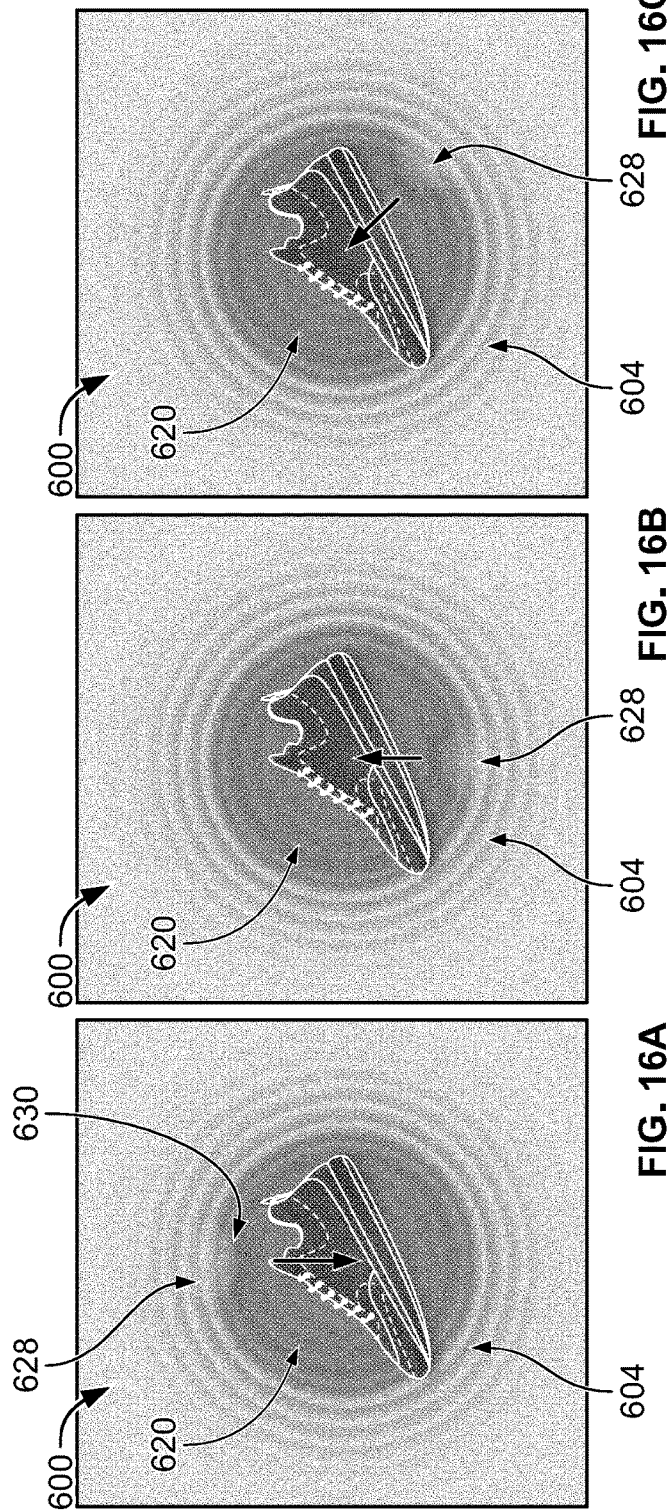
FIGS. 16A through 16C illustrate various states of the second graphical object of the third graphical layer for indicating different user inputs in accordance with embodiments.

Step 514 includes, in response to the detected movement at step 512, dynamically adjusting, on the display, a size of the second graphical object from the first size displayed at step 504 to a second or new size corresponding to the second intensity level marker associated with the second location. For example, as shown in FIGS. 14A-14C, the second graphical object, or intensity indicator 620, increases or scales up in size if the detected movement moves or drags away from the center of the first graphical object, or the intensity scale 604. And as shown in FIGS. 16A-C, the intensity indicator 620 decreases or scales down in size if the detected movement moves towards the center of the scale 604. As described herein, the second graphical object, or intensity indicator 620, can be configured to radially expand or contract when adjusting in size, so that the transition from one size to the next, or one intensity level marker 606 to the next, is visually smooth or fluid.

In some embodiments, the method 500 further includes step 516, which includes, in response to the detected movement at step 512, visually moving the fourth graphical object displayed at step 510 across the display in accordance with the detected movement. For example, the fourth graphical object, or contact indicator 626, may be moved from its initial display position, corresponding to the initial point of impression or contact, to a second position on the GUI 600 that corresponds to the second location of the touch-sensitive surface, or the location at which the movement stopped (e.g., due to the user stopping the dragging movement and/or lifting the finger or stylus off the touchscreen). Thus, the graphical user interface 600 is configured to not only adjust a size of the intensity indicator 620 in response to a dragging movement detected on the touch-sensitive surface, but also move the fourth graphical object, or contact indicator 626, in the direction of, or along with, the detected movement. In embodiments, the combined movements of these two graphical objects can give the appearance that the user is physically stretching the intensity indicator 620 to an expanded size by pulling outwards, or reducing the indicator 620 into a contracted size by pulling inwards.

For example, in some embodiments, the graphical user interface 600 may include two different contact indicators and only one of the indicators may be displayed depending on the type of movement detected. For example, as shown in FIGS. 13 and 14A-14C, the graphical user interface 600 may include a first contact indicator 626 (or increase indicator) if the dragging movement is directed away from the center of the intensity scale 604 or otherwise causes the intensity indicator 620 to expand in size. As shown, the first indicator 626 may be displayed adjacent to or at an edge of the intensity indicator circular 620 and may have an extended portion 629 configured to extend outside of the intensity indicator 620, so as to hint the increasing or expanding that is to come. As shown in FIGS. 15 and 16A-16C, the graphical user interface 600 may alternatively include a second contact indicator 628 (or decrease indicator), different from the first indicator 626, if the dragging movement is directed towards the center of the intensity scale 604, or otherwise causes the intensity indicator 620 to shrink in size. As shown, the second indicator 628 may also be displayed at or adjacent to an edge of the intensity indicator 620 and may have a lower portion 630 configured to extend into the intensity indicator 620, so as to hint at the decreasing or contracting that will occur. As also shown, both contact indicators 626 and 628 may remain at the edge of the intensity indicator 620 as the indicator 620 scales up or down in size, respectively, and an angle of each contact indicator 626, 628 may be configured so that a central axis of the indicator 626, 628 is aligned with, or pointed towards, the center of the intensity scale 604.

Figure 17B:
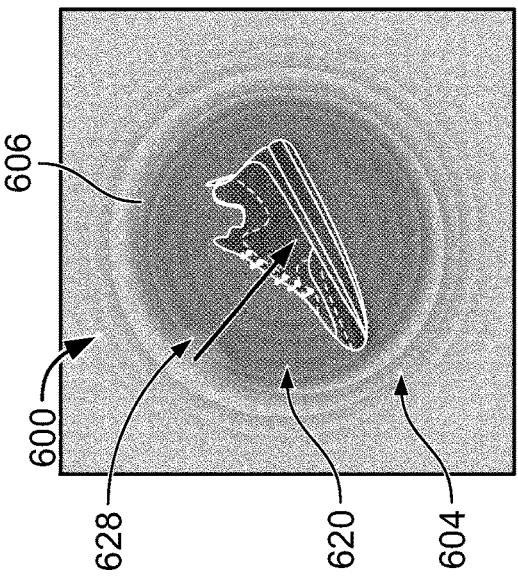
FIGS. 17A through 18B illustrates various changes in the first and third graphical layers during transitions from one intensity level to another in accordance with embodiments.
Figure 17A:
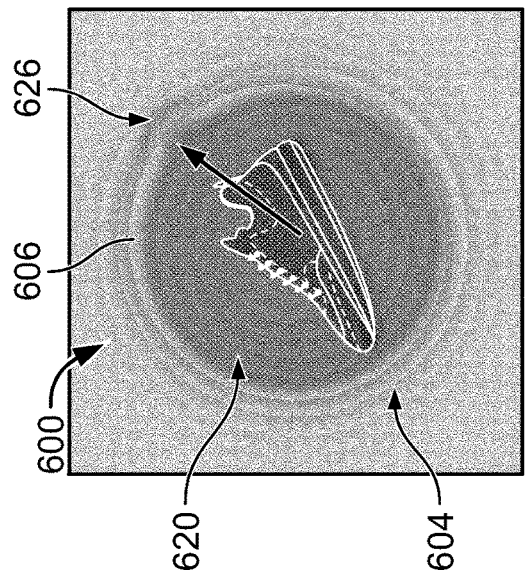

In some embodiments, in addition to the visual response provided by the contact indicators 626,628, the graphical user interface 600 may be further configured to cause the circular markers 606 to visually stretch or compress in response to the detected movement. For example, as shown in FIGS. 17A and 17B, as the intensity indicator 620 is expanded in size from more one marker 606 to the next, the circular ring 606 that is immediately adjacent to and larger than the intensity indicator 620 may be stretched outwards or increased in size, in the direction of the dragging movement, by a set amount (e.g., up to 10 points). Once the intensity indicator 620 is expanded beyond that stretched ring 606, or once the dragging movement stops, the stretched ring 606 pops or bounces back to its original position. If the dragging movement or expansion of the intensity indicator 620 continues, the next larger ring 606 is stretched outwards in a similar manner, and the process is repeated until the dragging movement stops and the intensity indicator 620 reaches its final size.

Figure 18B:
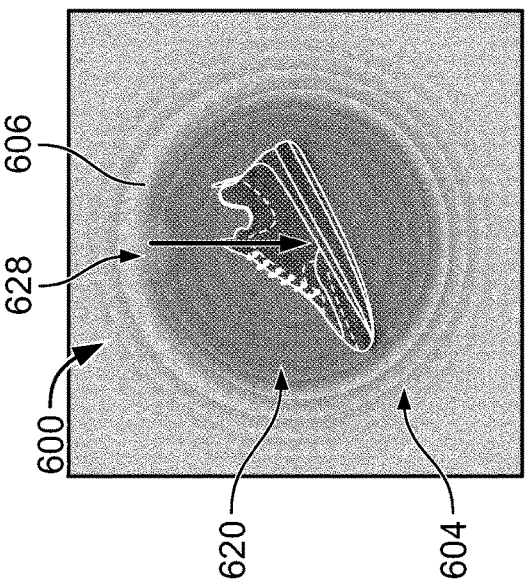
Figure 18A:
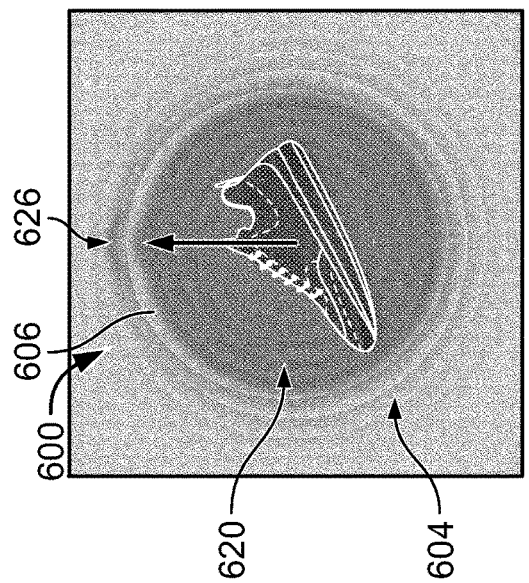

FIGS. 18A and 18B show a similar but reverse process for when the intensity indicator 620 is decreased in size. Namely, as the intensity indicator 620 is dragged to a smaller size, the circular ring 606 that is immediately adjacent to the intensity indicator 620 will shrink down or decrease in size by a set amount (e.g., up to 10 points) in the direction of the dragging movement. If the intensity indicator 620 continues to be decreased, or if the dragging movement stops, the contracted ring 606 will snap or bounce back to its original position. If the dragging movement or contraction of the intensity indicator 620 continues past that ring 606, the next smaller ring 606 is contracted inwards in a similar manner, and the process is repeated until the dragging movement stops and the intensity indicator 620 reaches its final size.

In some embodiments, the method 500 further includes, at step 518, adjusting an opacity of the first graphical object, or the intensity scale 604, as the second graphical object, or the intensity indicator 620, transitions to the second size. For example, as shown in FIGS. 10A-12B, the opacity of the intensity scale 604 may increase as the size of the intensity indicator 620 increases, for example, as shown by the different opacity levels when moving from FIG. 10B to 11B to 12B, each shown without the intensity indicator 620 for the sake of illustrating the change in opacity. Likewise, the opacity of the intensity scale 604 may decrease as the size of the intensity indicator 620 decreases, for example, as shown by the different opacity levels when moving in the reverse direction, e.g., FIG. 12B to 11B to 10B. 10B.

Figure 19A:
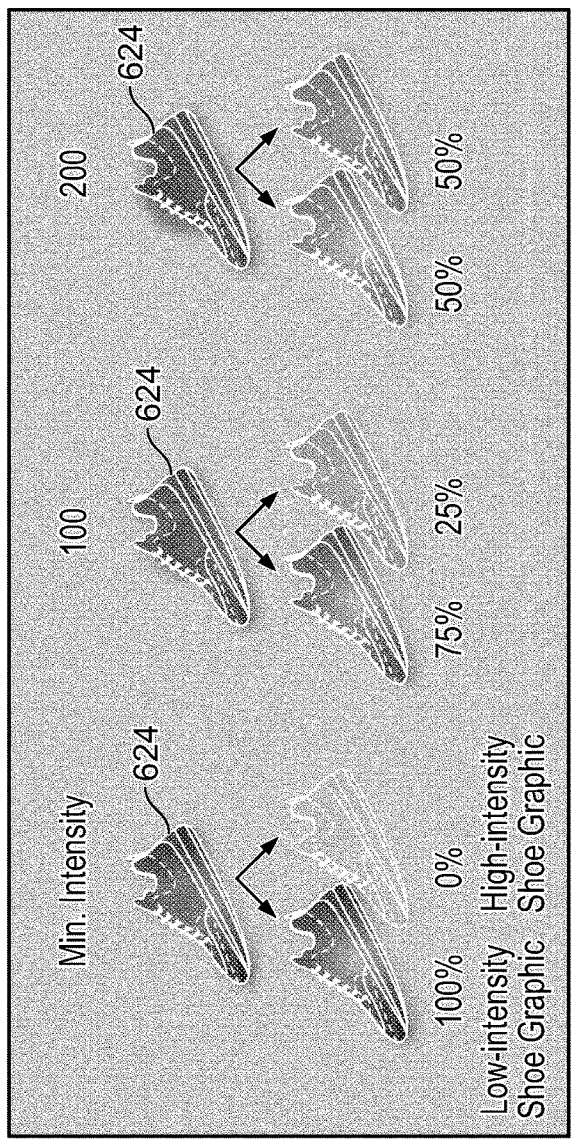
FIGS. 19A and 19B illustrate various states of a fourth graphical layer of the GUI shown in FIG. 6 at different intensity levels in accordance with embodiments.
Figure 19B:
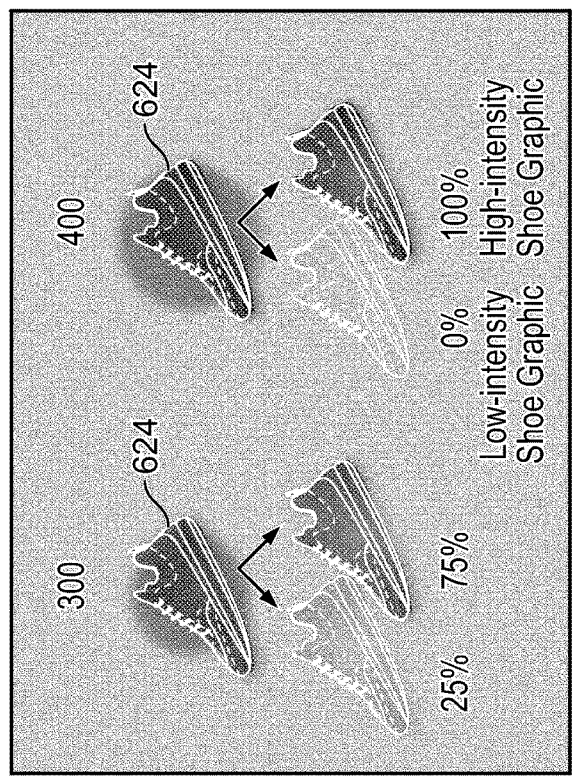

In some embodiments, the method 500 further includes, at step 520, adjusting, on the display, an opacity of the third graphical object as the second graphical object transitions to the second size. For example, as shown in FIGS. 19A and 19B, an overall opacity of the device icon 624 may increase as the intensity indicator 620 increases in size, or the vibrational intensity level otherwise increases. The exact increase in opacity may be configured to help keep the device icon 624 visible as the underlying first graphical layer, or intensity scale 604, also increases in opacity with the size expansion of the intensity indicator 620.

At step 522, the method 500 includes causing the haptic device to change a current vibrational intensity level to a second vibrational intensity level represented by the second marker. For example, the causing may include transmitting a data signal from the electronic device 602 to the external haptic device, the data signal comprising instructions to change a currently-selected vibrational intensity level to the second vibrational intensity level. In embodiments, the haptic device changes to the second vibrational intensity level as the second graphical object transitions to the second size, so that the user can feel the change in intensity level almost instantaneously, or in real-time or near real-time.

In some embodiments, the method 500 also includes, at step 524, providing a haptic feedback, using the electronic device, upon the haptic device changing to the second intensity level. For example, a haptic feedback system included in the electronic device 602 may be used to provide a tactile sensation to the user's finger each time the vibrational intensity level of the haptic device is altered.

In some embodiments, the haptic output of the haptic device can be muted by tapping the center of the graphical user interface 600, or the center of the intensity indicator 620. A second tap to the same center may unmute the haptic output. Haptic feedback may be provided via the touch screen to indicate a successful muting operation, or unmuting operation.

In some embodiments, the graphical user interface 600 is further configured to provide a pulsing animation to the intensity indicator 620 whenever the haptic device is actively vibrating. For example, the pulsing animation may include placing an edge animation ring around the intensity indicator 620 and growing a size of an edge animation ring to a preset size (e.g., by 20 or 30 points) and then immediately reducing the ring back to its original size. This animation may be repeated every few seconds, on a loop, so as to create a pulsing animation.

Thus, the embodiments described herein provide a graphical user interface (GUI) configured to control the vibrational intensity of an output generated by an external haptic device that is communicatively coupled to the electronic device being used to present the GUI. The GUI can be configured to visually and dynamically illustrate a change in vibrational intensity level as the actual intensity level of the haptic device changes. For example, the GUI can display up to four layers of graphical objects, each layer dynamically responding to a touch input for changing the vibrational intensity level of the haptic device and contributing to an animated GUI experience for controlling the output of the haptic device. At the same time, the electronic device can cause the haptic device to change its vibrational intensity level to a new intensity level associated with the touch input, such that the user can feel a change in the vibrational intensity level of the haptic device output as the user inputs this change using the graphical user interface.

Any process descriptions or blocks in the figures, such as FIG. 5, should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method for controlling an output generated by a haptic device, using an electronic device communicatively coupled to the haptic device and having a touch-sensitive surface and a display, the method comprising:
displaying, on the display, a first graphical object comprising a plurality of intensity level markers that are concentric circles with progressively increasing sizes, each marker having a different size and representing a different vibrational intensity level of the haptic device, wherein the concentric circles progressively increase in diameter from a central circle to an outermost circle, the central circle representing a minimum vibrational intensity level of the haptic device and the outermost circle representing a maximum vibrational intensity level of the haptic device, and wherein the plurality of intensity level markers comprises a first intensity level marker having a first marker size and representing a first vibrational intensity level, and a second intensity level marker having a second marker size and representing a second vibrational intensity level;
displaying, on the display, a second graphical object overlaying at least a portion of the first graphical object, the second graphical object having a first size substantially similar to the first marker size to indicate a selected vibrational intensity level of the haptic device as being the first vibrational intensity level;
detecting a contact at a first location of the touch-sensitive surface, the first location at least partially overlapping the second graphical object;
detecting a movement of the contact across the touch-sensitive surface to a second location of the touch-sensitive surface, the second location at least partially overlapping the second intensity level marker of the first graphical object; and
in response to the detected movement:
adjusting, on the display, a size of the second graphical object from the first size to a second size substantially equal to the second marker size, and
causing the haptic device to change the selected vibrational intensity level to the second vibrational intensity level.

2. The method of claim 1, wherein haptic device changes to the second vibrational intensity level as the second graphical object transitions to the second size.

3. The method of claim 1, wherein causing the haptic device to change includes transmitting a data signal from the electronic device to the haptic device comprising instructions to change the selected vibrational intensity level to the second vibrational intensity level.

4. The method of claim 1, wherein the second graphical object is configured to adjust radially when changing from the first size to the second size.

5. The method of claim 1, wherein the second graphical object includes a substantially circular object concentrically overlaying the first graphical object, the first size aligning the substantially circular object with the concentric circle formed by the first intensity level marker, and the second size aligning the substantially circular object with the concentric circle formed by the second intensity level marker.

6. The method of claim 1, wherein the size of the second graphical object increases if the detected movement moves away from a center of the first graphical object and decreases if the detected movement moves towards the center.

7. The method of claim 1, further comprising:
displaying, on the display, a third graphical object representing the haptic device on top of at least a portion of the second graphical object.

8. The method of claim 7, further comprising:
adjusting, on the display, an opacity of the third graphical object as the second graphical object transitions to the second size.

9. The method of claim 1, further comprising:
in response to the detected contact, displaying, on the display, a fourth graphical object representing the contact at an initial position that is at least partially on top of the second graphical object, the initial position corresponding to the first location of the touch-sensitive surface.

10. The method of claim 9, further comprising:
in response to the detected movement, moving the fourth graphical object across the display to a second position corresponding to the second location of the touch-sensitive surface.

11. The method of claim 1, further comprising:
adjusting an opacity of the first graphical object as the second graphical object transitions to the second size.

12. The method of claim 11, wherein the opacity of the first graphical object increases as the size of the second graphical object increases and decreases as the size of the second graphical object decreases.

13. The method of claim 1, further comprising:
providing a haptic feedback, using the electronic device, upon the haptic device changing to the second vibrational intensity level.

14. An electronic device, comprising:
a display;
a touch-sensitive surface;
a communication module in communication with an external haptic device;
one or more processors;
memory; and
one or more programs stored in the memory and configured to be executed by the one or more processors, the one or more programs including instructions for:
displaying, on the display, a first graphical object comprising a plurality of intensity level markers that are concentric circles with progressively increasing sizes, each marker having a different size and representing a different vibrational intensity level of the haptic device, wherein the concentric circles progressively increase in diameter from a central circle to an outermost circle the central circle representing a minimum vibrational intensity level of the haptic device and the outermost circle representing a maximum vibrational intensity level of the haptic device, and wherein the plurality of intensity level markers comprises a first intensity level marker having a first marker size and representing a first vibrational intensity level, and a second intensity level marker having a second marker size and representing a second vibrational intensity level;
displaying, on the display, a second graphical object overlaying at least a portion of the first graphical object, the second graphical object having a first size substantially similar to the first marker size to indicate a selected vibrational intensity level of the haptic device as being the first vibrational intensity level;
detecting a contact at a first location of the touch-sensitive surface, the first location at least partially overlapping the second graphical object;

detecting a movement of the contact across the touch-sensitive surface to a second location of the touch-sensitive surface, the second location at least partially overlapping the second intensity level marker of the first graphical object; and in response to the detected movement:

adjusting, on the display, a size of the second graphical object from the first size to a second size substantially equal to the second marker size, and causing the haptic device to change the selected vibrational intensity level to the second vibrational intensity level.

15. A non-transitory computer-readable storage medium storing one or more programs, the one or more programs comprising instructions for controlling an output generated by a haptic device, which, when executed by an electronic device with a display and a touch sensitive-surface, cause the electronic device to:

display, on the display, a first graphical object comprising a plurality of intensity level markers that are concentric circles with progressively increasing sizes, each marker having a different size and representing a different vibrational intensity level of the haptic device, wherein the concentric circles progressively increase in diameter from a central circle to an outermost circle, the central circle re representing a minimum vibrational intensity level of the haptic device and the outermost circle representing a maximum vibrational intensity level of the haptic device, and wherein the plurality of intensity level markers comprises a first intensity level marker having a first marker size and representing a first vibrational intensity level, and a second intensity level marker having a second marker size and representing a second vibrational intensity level;

display, on the display, a second graphical object overlaying at least a portion of the first graphical object, the second graphical object having a first size substantially similar to the first marker size to indicate a selected vibrational intensity level of the haptic device as being the first vibrational intensity level;

detect a contact at a first location of the touch-sensitive surface, the first location at least partially overlapping the second graphical object;

detect a movement of the contact across the touch-sensitive surface to a second location of the touch-sensitive surface, the second location at least partially overlapping the second intensity level marker of the first graphical object; and in response to the detected movement:

adjust, on the display, a size of the second graphical object from the first size to a second size substantially equal to the second marker size, and cause the haptic device to change the selected vibrational intensity level to the second vibrational intensity level.

* * * * *